United States Patent
Kim et al.

(10) Patent No.: US 6,742,269 B2
(45) Date of Patent: Jun. 1, 2004

(54) VERTICALITY/HORIZON INDICATOR FOR CONSTRUCTION

(76) Inventors: Byoung Chul Kim, 201/208 woobang 2nd. APT. Kumlak 1 Dong Hayang-up, Kyongsan City Kyoungbuk, 712-902 (KR); Sang-hwa Lee, Suseong-Gu, Mangchon-dong #389-29, Daegu city, 706-021 (KR); Vitali Khulugurov, Djukov Av. 68-554, Irkutsk City, 664050 (RU); Nikolay Ivanov, 4-ya Zheleznodorozhnaya Str. 100-119, Irkutsk City, 664074 (RU)

(*) Notice: Subject to any disclaimer, the term of this patent is extended or adjusted under 35 U.S.C. 154(b) by 0 days.

(21) Appl. No.: 10/142,004

(22) Filed: May 9, 2002

(65) Prior Publication Data

US 2002/0184774 A1 Dec. 12, 2002

(30) Foreign Application Priority Data

May 10, 2001 (KR) ................... 10-2001-0025556

(51) Int. Cl.$^7$ ............................................. G01C 15/10
(52) U.S. Cl. ....................... 33/283; 33/392; 33/DIG. 21
(58) Field of Search ......................... 33/252, 283, 391, 33/392, 393, DIG. 21

(56) References Cited

U.S. PATENT DOCUMENTS

| | | | | | |
|---|---|---|---|---|---|
| 2,848,818 A | * | 8/1958 | Krasover | .................... | 33/393 |
| 3,011,263 A | * | 12/1961 | Unger | .................... | 33/393 |
| 4,461,091 A | * | 7/1984 | Gammon | .................... | 33/392 |
| 4,597,186 A | * | 7/1986 | Markos | .................... | 33/392 |
| 4,625,428 A | * | 12/1986 | Griffin | .................... | 33/392 |
| 5,392,522 A | * | 2/1995 | O'Neil | .................... | 33/393 |
| 5,469,633 A | * | 11/1995 | St. Peter | .................... | 33/392 |
| 5,566,459 A | * | 10/1996 | Breda | .................... | 33/DIG. 21 |
| 6,073,353 A | * | 6/2000 | Ohtomo et al. | .................... | 33/DIG. 21 |
| 6,397,484 B1 | * | 6/2002 | Greene | .................... | 33/392 |

* cited by examiner

Primary Examiner—G. Bradley Bennett
(74) Attorney, Agent, or Firm—Jenkens & Gilchrist, P.C.

(57) ABSTRACT

A laser verticality/horizon indicator for construction is provided that realizes irradiation of laser beam, and indication of both a vertical point and a horizontal line using optical refraction. The laser verticality/horizon indicator embodies a scientific and systematic use mechanism through electrically controlled operation of equipment to indicate vertical and horizontal positions as a precise measurement, and to enhance the handling efficiency of the equipment. The laser verticality/horizon indicator includes a mounting board having a driving motor, a rotary bulb, a prism mounted in the rotary bulb, a battery receiving bulb used as a power supply, and a laser inducing hole. The laser verticality/horizon indicator further includes a laser generator separately mounted on the mounting board, and a plumb bob forming a body structure of the verticality/horizon indicator, the mounting board and the laser generator being installed in the plumb bob.

6 Claims, 4 Drawing Sheets

VERTICALITY/HORIZON INDICATOR FOR CONSTRUCTION

BACKGROUND OF THE INVENTION

1. The Field of the Invention

The present invention relates to a verticality/horizon indicator for construction and, more particularly, to a verticality/horizon indicator for construction that makes an up-to-down (vertical) laser beam diverged and projected horizontally due to optical refraction through a prism, thereby indicating a precise construction reference point in an engineering and construction site or the like.

2. Related Prior Art

Generally, a verticality/horizon indicator is used in determining a construction reference point for the sake of stable construction of a building (e.g., laying bricks or making the building level) in an engineering and construction site or the like. A plumb and a horizon leveler each having a general configuration are widely used as a construction reference point indicator.

Regarding the above-stated conventional construction reference point indicator, the plumb is a conical bob of a predetermined weight that is hanging down by a wire having a predetermined length. Disadvantageously, such a construction reference point indicator does not have a horizon indicating function but merely indicates verticality with the weight of the bob through the gravity of the earth. Besides, the construction reference point indicator has a structural problem in that the absolute position of the vertical point cannot be indicated unless the bob is in contact with the surface of the floor.

In addition, the horizon leveler includes a reference board having a square sheet structure, and a transparent glass tube containing a bubble and being disposed on the reference board. The operator can vary the position of the glass tube to position the bubble at the center of the glass tube, thereby keeping the reference board level. This operation is very troublesome and thereby consumes too much time.

SUMMARY OF THE INVENTION

It is therefore an object of the present invention to solve the problems with the conventional verticality/horizon indicator used in engineering and construction works and to provide a laser verticality/horizon indicator for construction that realizes irradiation of laser beam and indication of both a vertical point and a horizontal line using optical refraction, thereby achieving general use purposes and enhancing the working efficiency.

It is another object of the present invention to provide a laser verticality/horizon indicator for construction that embodies a scientific and systematic use mechanism through electrically controlled operation of equipment to indicate vertical and horizontal positions as a precise measurement and to enhance the handling efficiency of the equipment.

To achieve the objects of the present invention, there is provided a laser verticality/horizon indicator for construction that includes: a mounting board having a driving motor, a rotary bulb, a prism mounted in the rotary bulb, a battery receiving bulb used as a power supply means, and a laser inducing hole; a laser generator separately mounted on the mounting board; and a plumb bob forming a body structure of the verticality/horizon indicator, the mounting board and the laser generator being installed in the plumb bob.

DETAILED DESCRIPTION OF THE INVENTION

Hereinafter, the preferred embodiment of a laser verticality/horizon indicator for construction according to the present invention will be described in detail with reference to the accompanying drawings.

Figure 1:
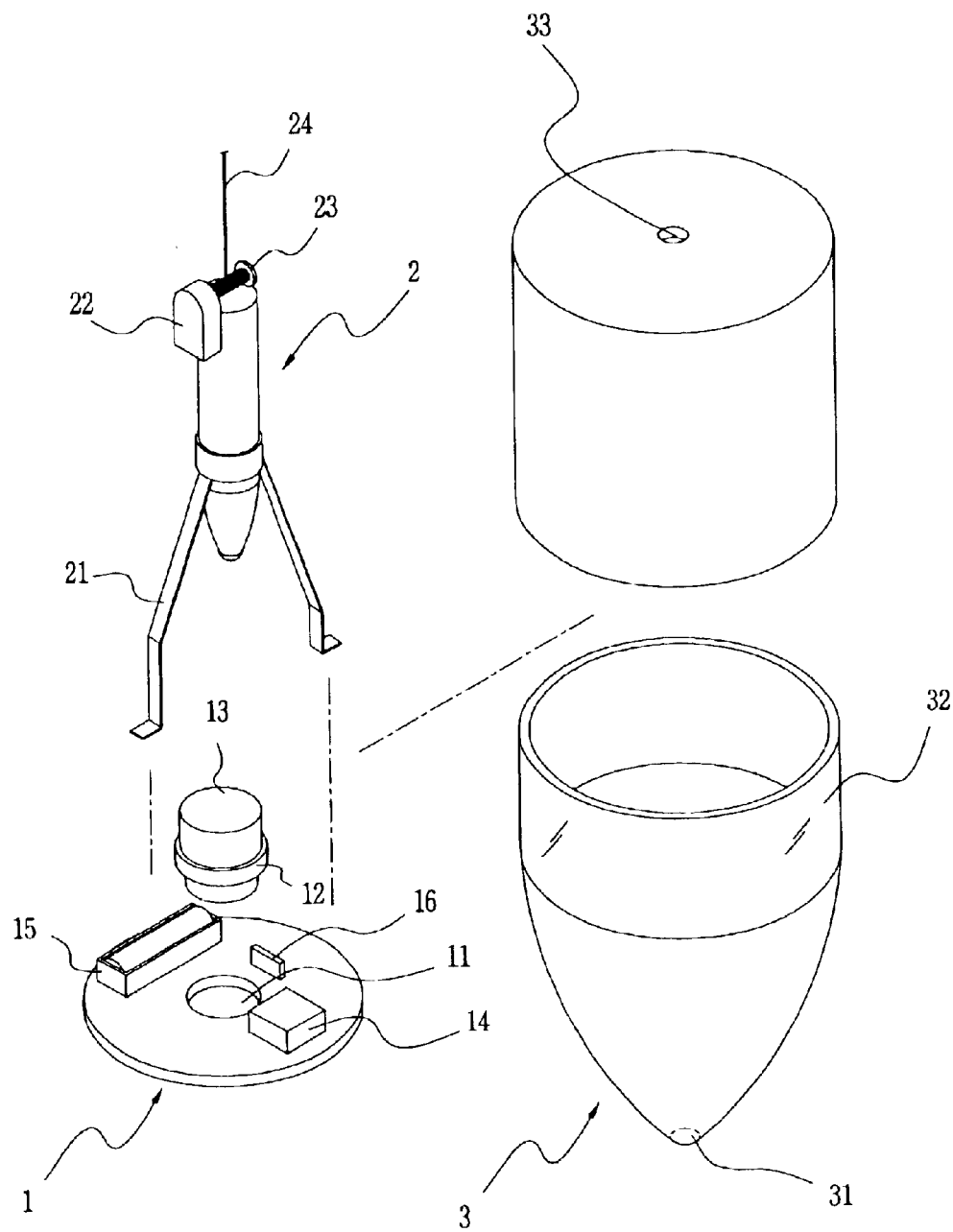
FIG. 1 is a partial exploded perspective of a laser verticality/horizon indicator for construction according to the present invention.
Figure 2:
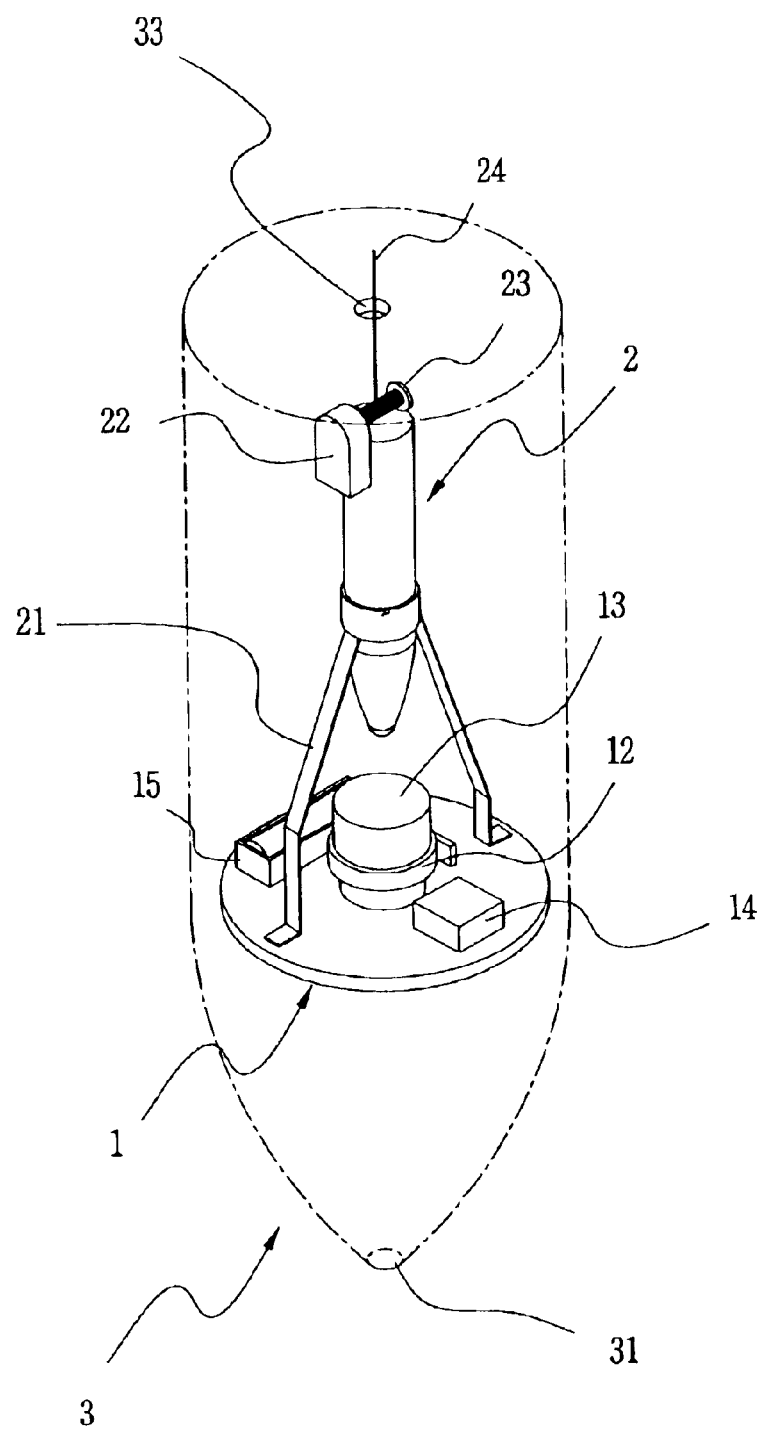
FIG. 2 is an internal perspective of the laser verticality/horizon indicator for construction according to the present invention.
Figure 3:
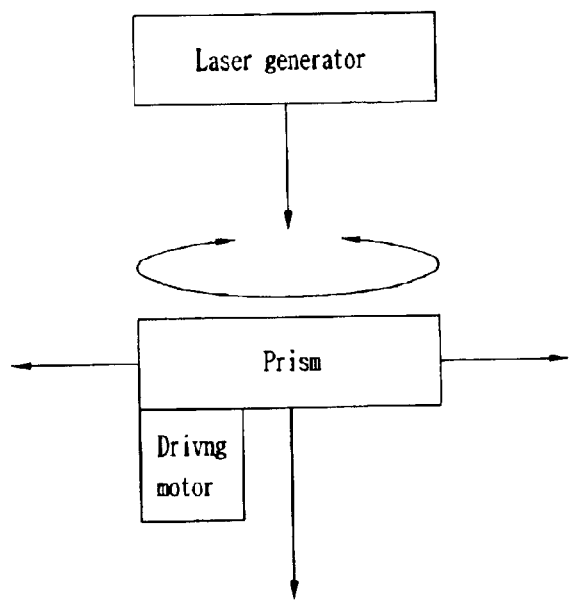
FIG. 3 is a distribution diagram of the laser verticality/horizon indicator for construction according to the present invention.
Figure 4:
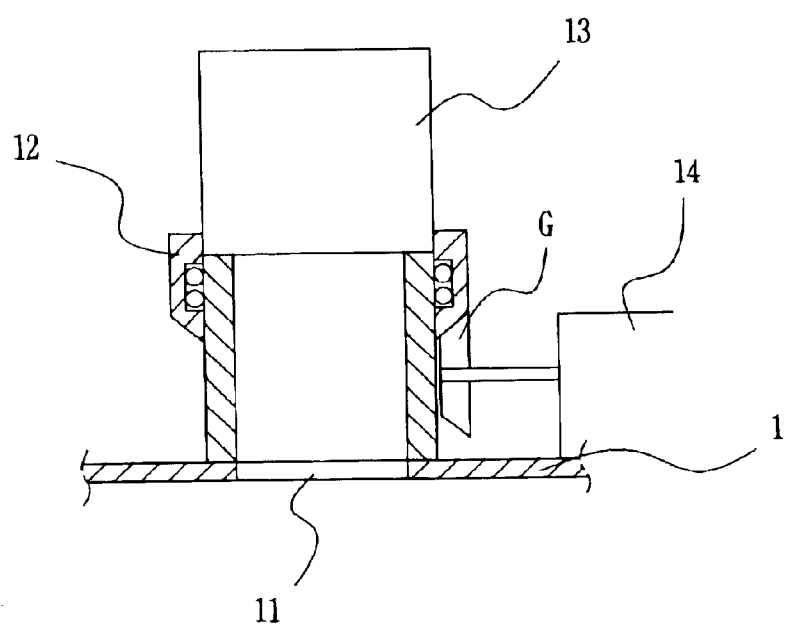
FIG. 4 is a schematic diagram showing an example of the dynamic connection between a prism and a driving motor used in the present invention.

FIG. 1 is a partial exploded perspective of a laser verticality/horizon indicator for construction according to the present invention. FIG. 2 is an internal perspective of the laser verticality/horizon indicator for construction according to the present invention. FIG. 3 is a distribution diagram of the laser verticality/horizon indicator for construction according to the present invention. FIG. 4 is a schematic diagram showing an example of the dynamic connection between a prism and a driving motor used in the present invention. The laser verticality/horizon indicator for construction comprises a mounting board 1 for mounting components, a laser generator 2 for irradiation of a laser beam, and a plumb bob 3 forming an outer body.

The mounting board 1 has a round tabular structure centrally provided with a laser inducing hole 11 having a through hole structure, as shown in FIG. 1. The mounting board 1 has a rotary bulb 12 on which a prism 13 is fixedly mounted through the laser inducing hole 11. A driving motor 14 used as a power transmission means is formed on the lateral side of the prism 13, i.e., on the one side of the mounting board 1. A battery receiving bulb 15 for removably mounting a battery is formed on the one side of the driving motor 14. Preferably, the battery receiving bulb 15 has a connection to a circuit board for turning the power on/off under the control of a remote controller, i.e., an infrared sensor 16

The driving motor 14 is a power source that imparts the rotational driving force to the prism 13. As shown in FIG. 4, the driving motor 14 has a connection of mutual gear G (e.g., bevel gear) with the rotary bulb 12 in which the prism 13 is mounted.

The laser generator 2 refers to a laser generating means of a general type (in principle and function) that absorbs energy amplified through transmission of medium with energy (pump) and emits it through a resonator. The laser generator 2 used in the present invention has a rod-shaped structure of a predetermined length, as shown in FIG. 1, and is preferably fixed on the mounting board 1 through a mounting frame 21.

On the laser generator 2 is mounted a reel 23 controlled by a driving motor 22, as shown in FIGS. 1 and 2, the reel 23 being wound with a length adjusting wire 24.

The lower portion of the plumb bob 3 has a conical structure, as shown in FIGS. 1 and 2, that is provided at the vertex with a vertical point hole 31 having a through hole structure. Preferably, a transparent window 32 made of a transparent material is formed on the outer circumference of the upper portion of the plumb bob 3, and a length adjusting guide hole 33 having a through hole structure is centrally formed on the plumb bob 3.

Now, the associated construction of the laser verticality/horizon indicator for construction will be described as follows:

As shown in FIG. 1, the laser generator 2 is integrally fixed on the mounting board 1 equipped with the laser inducing hole 11, the driving motor 14, the prism 13, the battery receiving bulb 15 and the infrared sensor 16. The laser generator 2 is disposed vertically in a straight line with the laser inducing hole 11 of the mounting board 1 and separated at a predetermined distance from the mounting board 1 by the mounting frame 21. The mounting board 1 and the laser generator 2 of the above-described connection are installed in the plumb bob 3, as shown in FIG. 2, to construct the laser verticality/horizon indicator for construction according to the present invention.

With the mounting board 1 and the laser generator 2 provided in the plumb bob 3, the vertical point hole 31 of the plumb bob 3 is disposed vertically in a straight line with the laser generator 2 and the laser inducing hole 11, the prism 13 of the mounting board 1 being disposed horizontally with the transparent window 32 of the plumb bob 3, as shown in FIG. 2. The length adjusting hole 34 wound around the reel 33 is drawn in and off the length adjusting guide hole 33 of the plumb bob 3.

Now, the operation of the laser verticality/horizon indicator for construction having the above-stated connection will be described as follows.

With the plumb bob 3 hanging down by the length adjusting wire 24 at a construction site or the like, the operator sends a length adjusting signal with a remote controller. Then the reel 23 is rotated through the driving motor 22 according to the signal control of the infrared sensor 16 so as to adjust the length of the plumb bob 3 with the length adjusting wire 24 wound around the reel 23.

As the length of the plumb bob 3 is adjusted through the reel 23, the operator sends a driving signal to the laser verticality/horizon indicator for construction with the remote control. Upon receiving the signal at the infrared sensor 16, the driving motor 14 transfers the rotational force to the prism 13, and the laser generator 2 emits a laser beam (light) vertically.

The vertically irradiated laser beam passes through the prism 13 to cause optical refraction, as shown in FIG. 3. Thus the laser beam irradiated vertically through the prism 13 indicates a vertical point on the floor of the construction site through the vertical point hole 31 of the plumb bob 3, while the light (laser beam) refracted from the prism 13 is irradiated horizontally through the transparent window 32 of the plumb bob 3.

The laser beam passing through the transparent window 32 is radially spread into a great number of points through the rotation of the prism 13. The light points form a horizontal line on the outer wall of the construction site due to an optical illusion, thereby realizing indication of verticality and horizon.

The prism having a rotational function and a laser beam refracting function in the present invention is not merely limited to the prism 13 and may be replaced with a semi-reflection mirror (not shown) that makes half of the laser beams irradiated vertically and the rest of the laser beams refracted horizontally, which construction is within the scope of the present invention.

Figure 5:
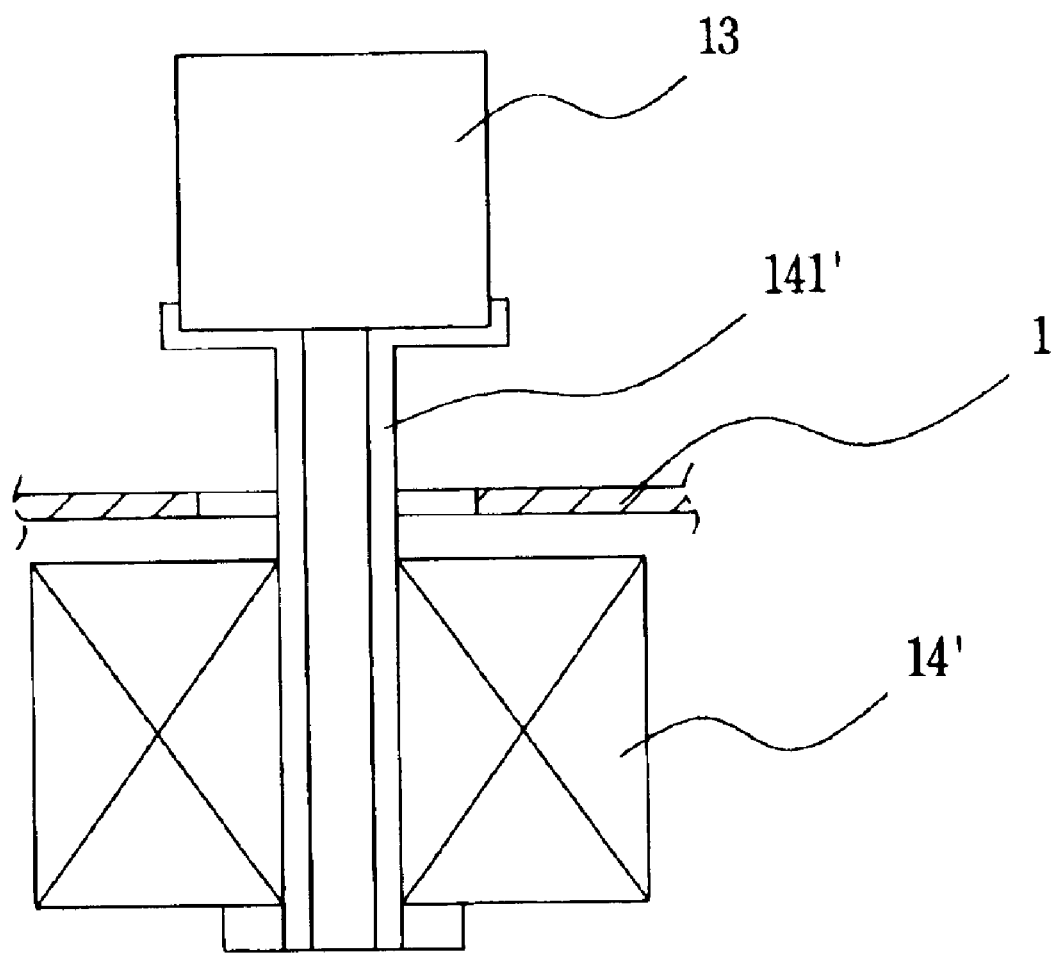
FIG. 5 is a diagram showing another example of the driving connection for driving the prism in the present invention.

FIG. 5 shows another example of the connection for driving the prism 13 in the present invention. In FIG. 5, a beam inducing tube 141' having a tubular through hole structure is formed as a power transmission axis of a driving motor 14' and vertically integrated with the lower portion of the prism 13, i.e., the rotary bulb 12 in which the prism 13 is mounted. Thus this construction transfers the direct rotational force to the prism 13 without a separate gear connection and induces the vertically irradiated laser beam through the beam inducing tube 141', which construction is within the scope of the present invention.

As described above, the laser verticality/horizon indicator for construction according to the present invention enables irradiation of laser beam and indication of both a vertical point and a horizontal line using optical refraction, thereby achieving general use purposes and enhancing the working efficiency.

In addition, the present invention embodies a scientific and systematic use mechanism through electrically controlled operation of equipment to indicate vertical and horizontal positions as a precise measurement and to enhance the handling efficiency of the equipment, thereby providing very useful functions for the user.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A laser verticality/horizon indicator for construction comprising:

a mounting board having a driving motor, a rotary mount, a prism mounted in the rotary mount, a battery receiving mount used as a power supply means, and a laser inducing hole, the driving motor being adapted to impart a rotational driving force to the prism;

a laser generator separately mounted on the mounting board; and a plumb bob forming a body structure of the verticality/horizon indicator, the mounting board and the laser generator being installed in the plumb bob.

2. The laser verticality/horizon indicator for construction as claimed in claim 1, further comprising an infrared ray sensor mounted on the mounting board for controlling a defined driving mechanism with a remote controller.

3. The laser verticality/horizon indicator for construction as claimed in claim 1, further comprising a reel being disposed on the laser generator and controlled by the driving motor, the reel being wound with a length adjusting wire for remotely regulating the length in use.

4. The laser verticality/horizon indicator for construction as claimed in claim 1, wherein the plumb bob comprises:

a vertical point hole for vertically irradiating a laser beam;

a transparent window for horizontally irradiating the laser beam; and a length adjusting guide hole for connection of the length adjusting wire.

5. The laser verticality/horizon indicator for construction as claimed in claim 1, further comprising:

a second driving motor mounted on the lower end of the prism and having a beam inducing tube for power transmission and induction of a vertically radiated laser beam.

6. The laser verticality/horizon indicator for construction as claimed in claim 1, wherein the prism is formed with a semi-reflection mirror.

* * * * *